(12) United States Patent
Swain (10) Patent No.: US 8,888,998 B2
(45) Date of Patent: Nov. 18, 2014

(54) BYPASS VALVE FOR WATER FILTER SYSTEM

(75) Inventor: David Swain, Palm Harbor, FL (US)

(73) Assignee: Paragon Water Systems, Inc., Clearwater, FL (US)

( * ) Notice: Subject to any disclaimer, the term of this patent is extended or adjusted under 35 U.S.C. 154(b) by 449 days.

(21) Appl. No.: 12/852,582

(22) Filed: Aug. 9, 2010

(65) Prior Publication Data

US 2012/0031821 A1 Feb. 9, 2012

(51) Int. Cl.
*B01D 35/147* (2006.01)
*B01D 35/157* (2006.01)
*B01D 35/30* (2006.01)
B01D 35/14 (2006.01)

(52) U.S. Cl.
CPC .............. *B01D 35/147* (2013.01); *B01D 35/30* (2013.01); *B01D 2201/165* (2013.01); *B01D 2201/302* (2013.01)
USPC ............... 210/87; 210/232; 210/238; 210/90; 210/91; 210/97; 210/130; 210/137; 210/418; 210/420; 210/424; 210/431

(58) Field of Classification Search
USPC ......... 210/87, 232, 424, 431, 238, 90, 91, 97, 210/130, 137, 444, 418, 420, 423
See application file for complete search history.

(56) References Cited

U.S. PATENT DOCUMENTS

| | | | |
|---|---|---|---|
| 3,746,171 A | 7/1973 | Thomsen | |
| 3,907,688 A * | 9/1975 | Close | 210/424 |
| 3,926,815 A * | 12/1975 | McClory | 210/424 |
| 3,935,106 A * | 1/1976 | Lipner | 210/232 |
| 4,806,240 A | 2/1989 | Giordano et al. | |
| 4,857,189 A | 8/1989 | Thomsen et al. | |
| 4,956,086 A | 9/1990 | Thomsen et al. | |
| 5,931,196 A | 8/1999 | Bernardi et al. | |
| 6,644,349 B2 | 11/2003 | Scanlan et al. | |

* cited by examiner

*Primary Examiner* — Nam Nguyen
*Assistant Examiner* — Madeline Gonzalez
(74) *Attorney, Agent, or Firm* — Greer, Burns & Crain, Ltd.

(57) ABSTRACT

A head for a water filter system having a filter element including a three-way valve member movable between a first position, a second position, and a third position. When the valve member is in the first position, incoming water is directed to the filter element to remove sediment and impurities from the water. When the valve member is in the second position, the incoming water is blocked from passing through the filter element and the valve member. Lastly, when the valve member is in the third position, the incoming water passes through the valve member and not the filter element so that the filter element can be removed and replaced without interrupting the incoming water flow.

12 Claims, 12 Drawing Sheets

BYPASS VALVE FOR WATER FILTER SYSTEM

BACKGROUND

The present invention relates generally to water treatment devices, and more particularly to a bypass valve for a water filter system.

Residential water is delivered to homes from water sources such as wells and municipal water systems. The incoming raw water typically carries sediment and other impurities. To remove these unwanted components from the incoming water, many households have a filter system connected directly to the incoming water pipe, typically located in a basement or a garage. The filter system usually has a head component that is plumbed to the incoming water pipe and a filter cartridge that is detachably connected to the head component.

Over time, the sediment and impurities build up on the filter element in the filter cartridge and reduce its filtration capacity. Therefore, the filter cartridge needs to be replaced. Such filter systems typically include a valve that has a lever or handle that is movable between "on" and "off" positions. In the "on" position, the valve directs incoming water to the filter cartridge, which removes the sediment and impurities from the water, and then directs the treated water out of the filter system. In the "off" position, the valve blocks the incoming water from flowing through the filter cartridge, allowing replacement of the filter cartridge. After a new filter cartridge is connected to the head component, the lever on the valve is moved back to the "on" position.

In conventional filter systems, the incoming water flow is stopped each time the filter is replaced. Such stoppage of water is inconvenient and burdensome when water is needed in the household such as for showering and washing clothes. Also, if there is a problem with the filter such that it cannot be used, and a replacement filter is not readily available, the water supply could be interrupted for longer periods of time. Thus, an important design criteria for such filter systems is the continuous usage of water when the filter is being replaced.

SUMMARY

A water filter system including a filter element is provided having a head with a bypass feature. By allowing untreated water that enters the filter system to be bypassed or diverted away from the filter cartridge and directly passed to the point of use, a user can easily replace the filter cartridge when needed without interrupting the household water supply.

More specifically, a head for a water filter system is provided having a filter element including a three-way valve member movable between a first position, a second position, and a third position. When the valve member is in the first position, incoming water is directed to the filter element to remove sediment and impurities from the water. When the valve member is in the second position, the incoming water is blocked from passing through the filter element and the valve member. Lastly, when the valve member is in the third position, the incoming water passes through the valve member and not the filter element so that the filter element can be removed and replaced without interrupting the incoming water flow.

In another embodiment, a head for a water filter system having a filter element is provided and includes an inlet, an outlet and a rotatable valve member (or spindle) defining a through channel and a bypass channel. A handle is mounted to the rotatable valve member and is rotatable to one of an "on" position, an "off" position and a "bypass" position. When the handle is in the "on" position, the through channel is aligned with the inlet and the outlet to allow water to flow through the filter element. When the handle is in the "off" position, neither of the through channel and the bypass channel are aligned with the inlet and the outlet. Lastly, when the handle is in the "bypass" position, the bypass channel is aligned with the inlet and the outlet to allow water to flow through the bypass channel but not through the filter element.

In a further embodiment, a water filter system is provided having a head including an inlet, an outlet and a rotatable valve member defining a through channel and a bypass channel. A handle is mounted to the rotatable valve member, the handle being rotatable to one of an "on" position, an "off" position and a "bypass" position. A filter housing is removably mounted to the head and includes a filter element for removing sediment and impurities from water. When the handle is in the "on" position, the through channel is aligned with the inlet and the outlet to allow water to flow through the filter element. When the handle is in the "off" position, neither of the through channel and the bypass channel are aligned with the inlet and the outlet. Lastly, when the handle is in the "bypass" position, the bypass channel is aligned with the inlet and the outlet to allow water to flow through the head but not through the filter element.

DETAILED DESCRIPTION

Referring now to FIGS. 1-12, a filter system, generally designated as 20, is used in homes, businesses and other facilities to filter incoming water for removal of sediment, taste, odor and other impurities. The filter system 20 includes a filter head 22 and a filter housing or filter body 24 removably attached to the filter head, where the filter head includes an inlet 26 and an outlet 28 that are each removably connected to an incoming water pipe or conduit. As further described below, the incoming water enters the inlet 26 and passes through a filter element 30 (FIG. 5) seated within the filter body 24, which removes sediment and other impurities from the water. The filtered water then exits the filter system 20 through the outlet 28 and flows through piping to faucets, showers and the like within the house or building.

Figure 1:
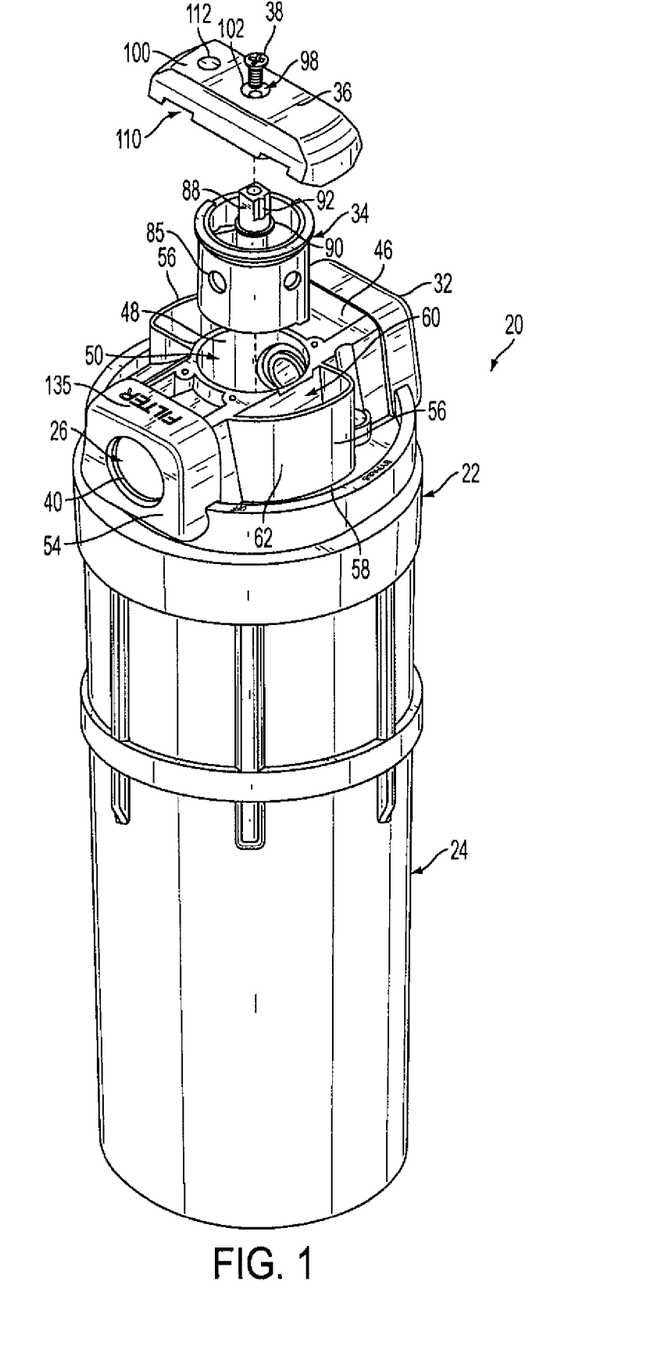
FIG. 1 is an exploded perspective view of the present water filter system.
Figure 2:
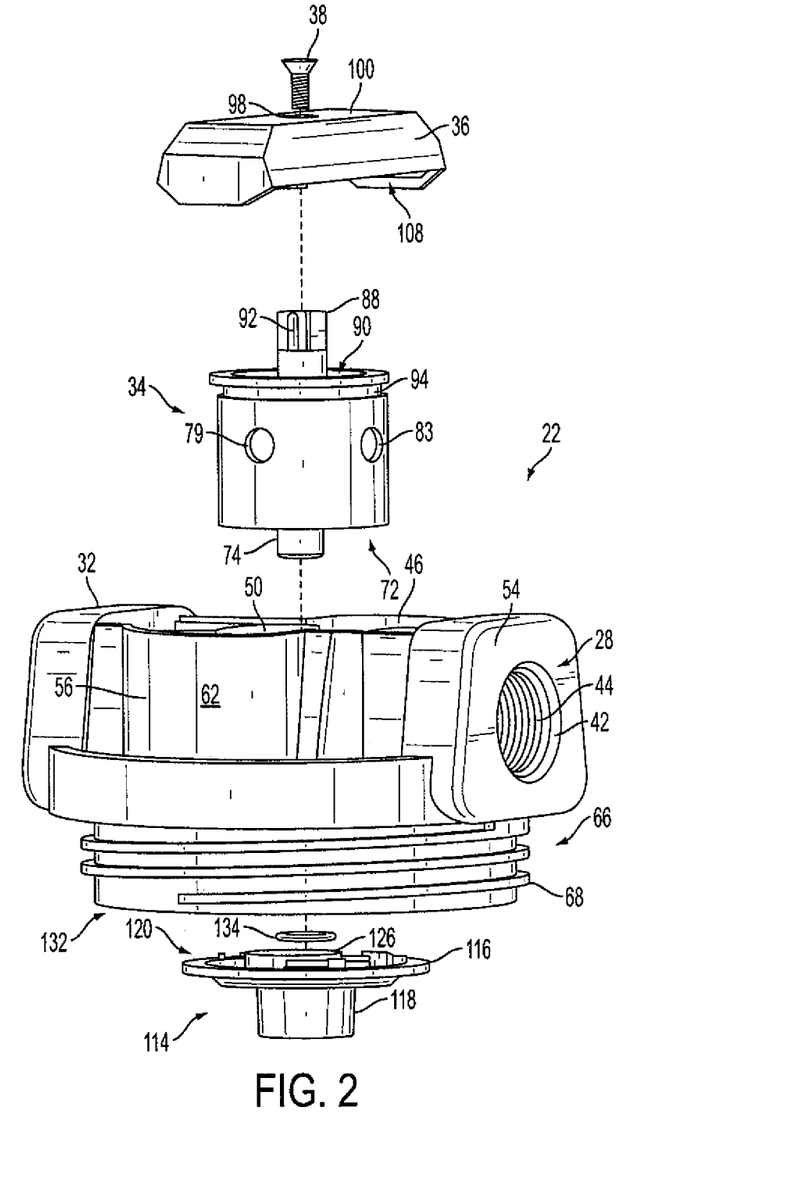
FIG. 2 is an exploded perspective view of the filter head of the water filter system of FIG. 1.

Referring to FIGS. 1-4, the filter head 22 includes a valve body 32, a valve member 34 that is axially, rotatably mounted to the valve body and a handle 36 that is connected to the valve member by a fastener such as a screw 38. As shown in FIGS. 1 and 2, the valve body 32 is integrally formed and defines an inlet port 40 (FIG. 1) and an outlet port 42. The inlet and outlet ports 40, 42 each include an interior surface having threads 44 that engage threads on an outer surface of a pipe or similar conduit.

Figure 5:
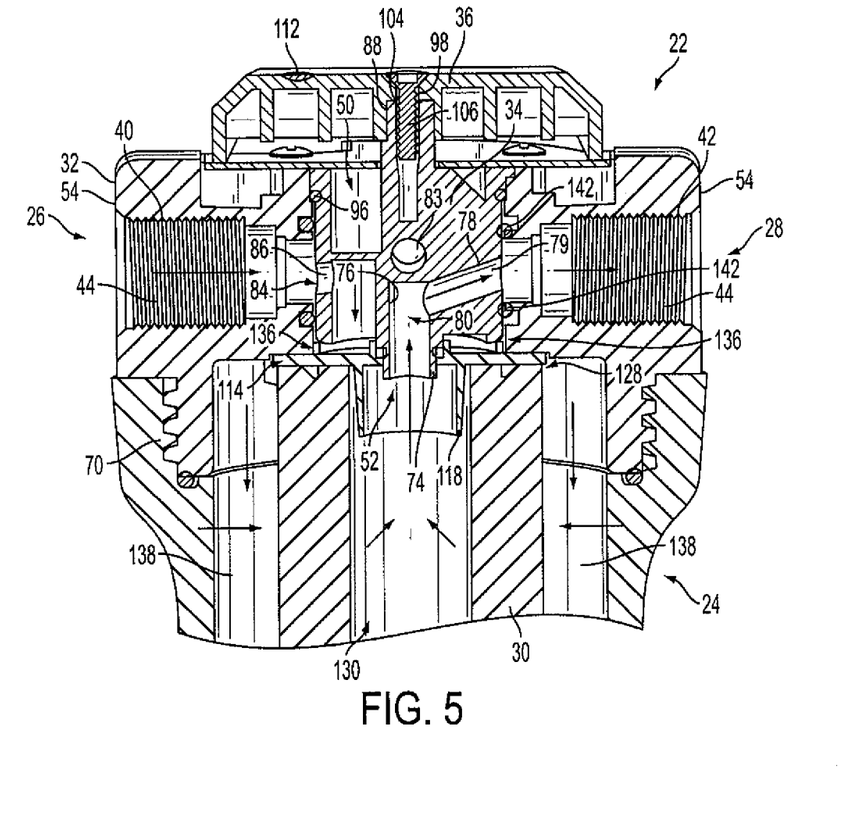
FIG. 5 is a cross-section view of the filter head of FIG. 3 taken along line 5-5 and in the direction indicated, where the valve member is in the "filter" position.
Figure 9:
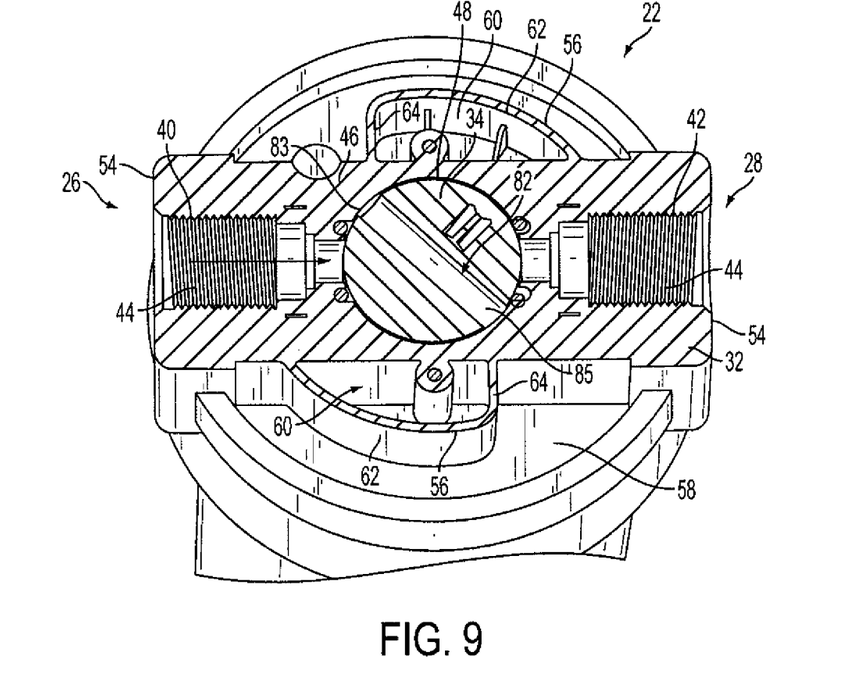
FIG. 9 is a fragmentary top view of the filter head of FIG. 8 with the upper portion of the filter head and the handle removed.

A top or upper surface 46 of the valve body 32 defines a central bore 48 that is configured to receive the valve member 34 as described below. The central bore 48 has an open top end 50 having a first diameter and an open bottom end 52 (FIG. 5) having a second diameter, where the second diameter is less than the first diameter. As shown in FIGS. 5 and 9, the inlet port 40 and the outlet port 42 both extend from an outer surface 54 of the valve body 32 through to the central bore 48. Thus, incoming water will flow to the central bore 48 and outgoing water will flow from the central bore.

Figure 3:
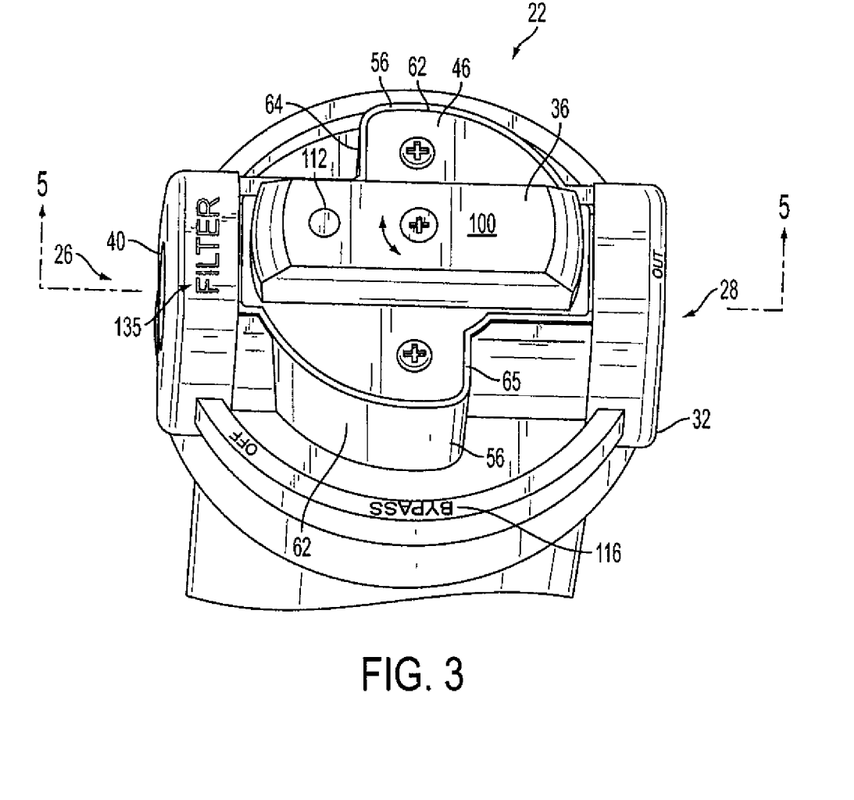
FIG. 3 is a top perspective view of the filter head of FIG. 2.

Referring now to FIGS. 1-3, the valve body 32 also includes two opposing, generally curved walls 56 that project or extend from a lower surface 58 of the valve body 32 to the upper surface 46. Each of the walls 56 defines a hollow interior chamber 60 forming supports for the handle 36 as further described below. Furthermore, each of the walls 56 has a generally curved portion 62 and a generally straight portion 64 (FIG. 3) extending from the curved portion. It should be appreciated that the walls 56 may have any suitable shape. Additionally, at least a portion of the valve body 32 projects or extends upwardly to form a stop 65 for stopping the movement of the handle 36. A bottom portion 66 (FIG. 2) of the valve body 32 includes threads 68 that engage corresponding threads 70 (FIG. 5) on an inside surface of the filter body 24 for securing the filter head 22 to the filter body as is known in the art.

Figure 4:
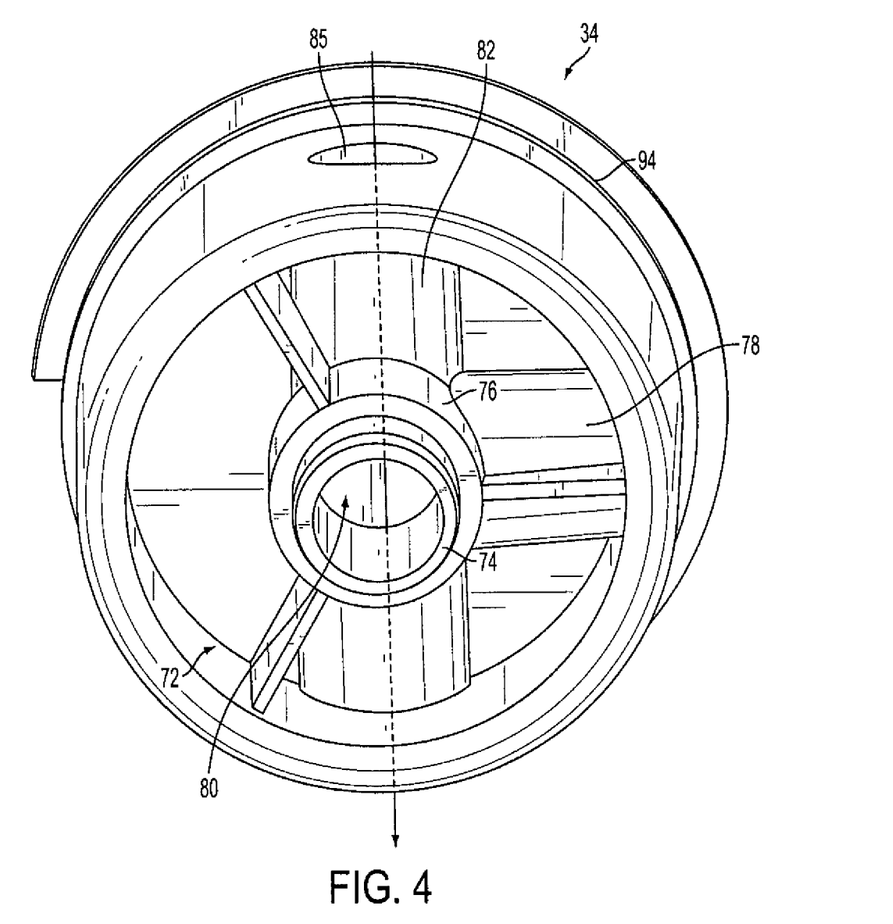
FIG. 4 is a bottom perspective view of the valve member located in the filter head of FIG. 2.

Referring to FIGS. 1-5, the valve member 34 has a generally circular cross-sectional shape and is configured to be seated within the central bore 48 of the valve body 32. A bottom end 72 (FIG. 4) of the valve member 34 has a hollow, depending post 74 with a generally vertical portion 76 and an angled portion 78 that extends from the vertical portion to an opening 79 (FIG. 5). As seen in FIGS. 4 and 5, the vertical portion 76 and the angled portion 78 form a first flow channel 80 (FIG. 5) that directs the filtered water from the filter element 30, through the opening 79 and to the outlet port 42 of the valve body 32 as described below. A second, bypass flow channel 82 (FIG. 11) is also provided in the valve member 34 and extends across the diameter of the valve member from an opening 83 to an opposing opening 85. A third, treatment flow channel 84 (FIG. 5) extends from an opening 86 on the valve member 34 into the filter element 30.

A handle post 88 extends upwardly from an upper surface 90 of the valve member 34. At least a portion of the handle post 88 has a flat surface including at least one tab or protrusion 92 (FIGS. 1, 2) that helps to secure the valve member 34 to the valve handle 36 for common rotation as described below. A peripheral seal groove 94 is provided in the valve member 34 for forming a seal between the valve member and the valve body 32. Water is thus prevented from escaping through the top of the valve member 34. Accordingly, the seal groove 94 is configured to receive an O-ring 96 (FIG. 5). It should be appreciated that one or more seal grooves 94 and O-rings 96 may be employed as needed.

Referring now to FIGS. 1 and 5, it is preferred that the handle 36 has a generally rectangular shape and defines a throughbore 98 configured to receive the handle post 88 of the valve member 34. A fastener such as the screw 38 is insertable into the throughbore 90, and is chamfered or counter-sunk to enable the head of the screw to be flush with an upper surface 100 of the valve handle 36 after the fastener has been connected to the handle post 88. Specifically, the handle post 88 defines internal threads 104 that engage outer threads 106 of the screw 38 for securing the handle 36 to the valve member 34. Thus, the valve handle 36 is fixedly secured to the valve member 34 such that the valve member turns in unison with the valve handle. An underside 108 of the valve handle 36 defines an annular groove or recess 110 (FIG. 1) that allows clearance between the bottom of the handle and the upper surface 46 of the valve body 32 so that the handle is easier to turn.

Figure 10:
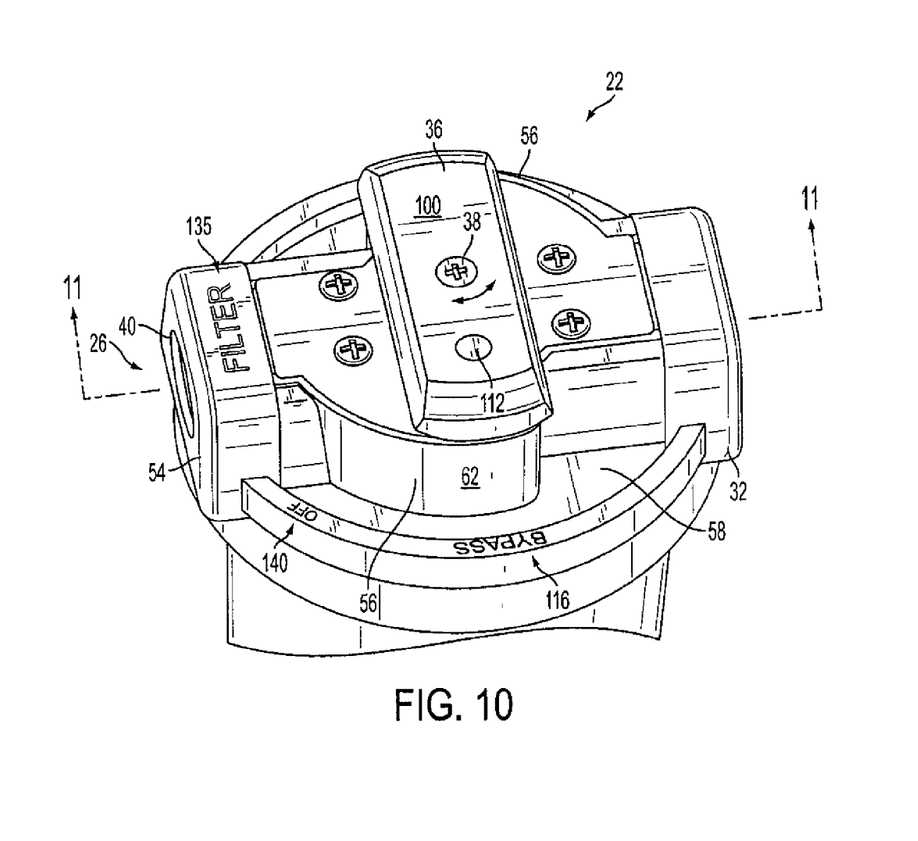
FIG. 10 is a top perspective view of the filter head of FIG. 3 where the valve member is in the "bypass" position.
Figure 12:
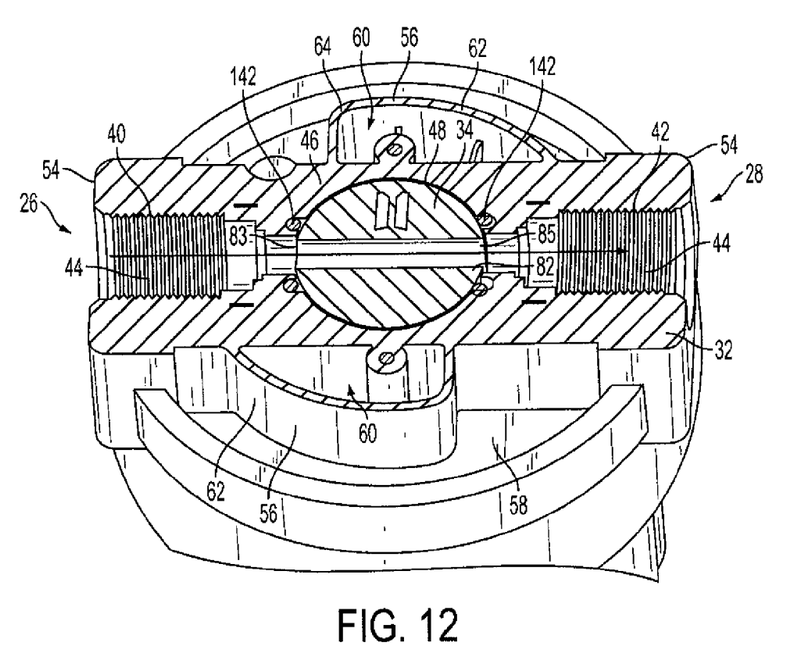
FIG. 12 is a top view of the filter head of FIG. 11 with the upper portion of the filter head and the handle removed.

The valve handle 36 also has a semi-circular recess 112 or other visual indicator at a first end 114 (FIG. 5) which identifies the valve member position that corresponds to the position of the valve handle 36 relative to the valve body 32. For example, the end 114 of the valve handle 36 having the indicator 112 is aligned with a flow indicator such as the word "Bypass" 116 on the valve body 32 to indicate that the valve member 34 is in the bypass position. Preferably, the indicator 112 includes a distinguishable feature such as a color or is raised or structurally, tactilely or visually distinctive to make it easier for a user to identify the position of the valve member 34. Also, the valve handle 36 includes a longitudinal axis that is transverse to the second flow channel 82 as shown in FIGS. 10 and 12 such that the position of the handle does not indicate the direction of flow through the valve body 32. It should be appreciated that the longitudinal axis of the valve handle 36 may be aligned with the second flow channel 82 or have any suitable positional relationship relative to the second flow channel.

Figure 8:
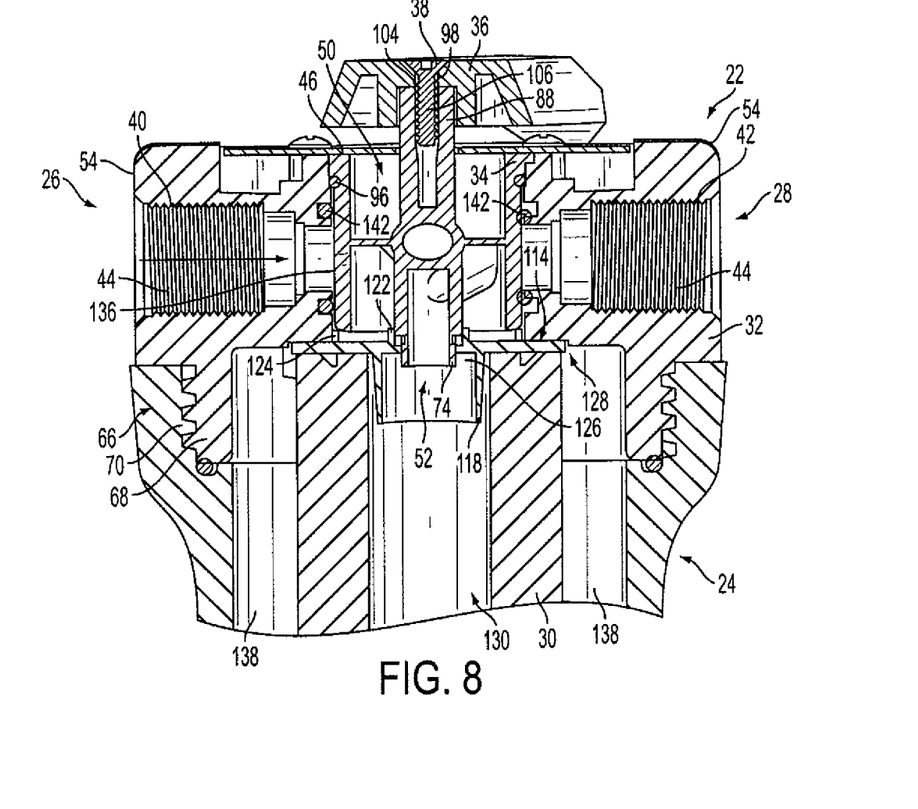
FIG. 8 is a cross-section of the filter head of FIG. 7 taken along the line 8-8 and in the direction indicated.

Before attaching the filter head 22 to the filter body 24, a support plate 114 (FIG. 2) is seated in the top of the filter body 24. The support plate 114 includes a circular upper planar portion 116 having an upper diameter and a downwardly extending annular wall 118 that has a lower diameter that is less than the upper diameter. As shown in FIG. 8, an upper surface 120 of the support plate 114 includes inner, upwardly extending alignment tabs 122 and outer upwardly extending alignment tabs 124. It is preferred that the inner alignment tabs 122 are constructed and arranged to correspond to an outer diameter of the lower post 74 of the valve member 34 and help to guide the post into a central opening 126 defined by the support plate 114. The outer alignment tabs 124 are spaced to correspond to the outer diameter of the valve member 34 and further help to align the valve member relative to the filter body 24. The support plate 114 is preferably integrally formed and is seated on opposing inner shoulders 128 of the filter body 24 such that the downwardly extending annular wall 118 of the support plate extends into a central chamber 130 defined by the filter element 30 after the support plate is seated on the filter body. Preferably, the support plate 114 is made out of a durable material such as plastic but may be made out of any suitable material.

After the support plate 114 is seated on the filter body 24, the filter head 22 is threadingly engaged with the filter body 24 so that the lower post 74 of the valve member 34, which at least partially extends from a bottom surface 132 of the valve body 32, is inserted into the opening 126 of the support plate 114 and between the inner alignment tabs 122. An O-ring 134

(FIG. 2) is positioned to form a seal between the valve member 34 and the support plate 114 within the inner alignment tabs 122.

Figure 6:
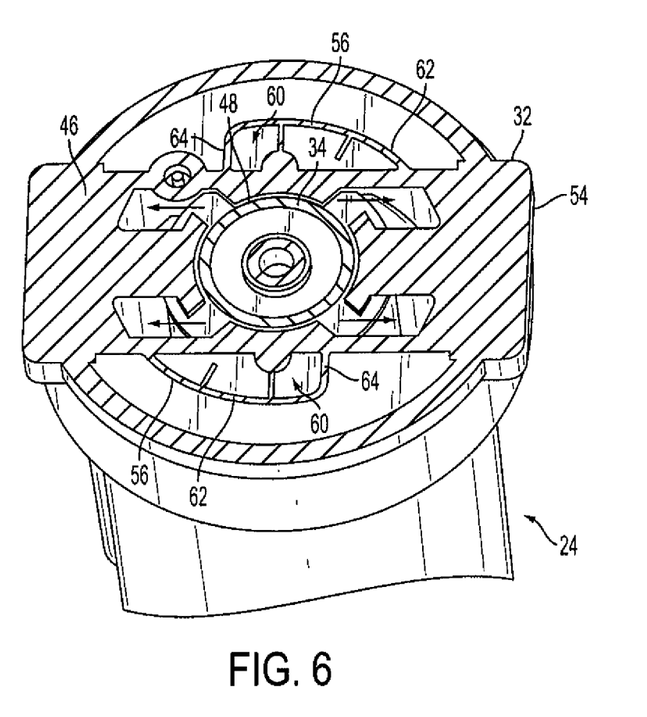
FIG. 6 is a fragmentary top view of the filter head of FIG. 5 with the upper portion of the filter head and the handle removed.

Once the filter system 20 is connected to an incoming water pipe or conduit to begin filtering water, the user turns the handle 36, thereby turning the valve member 34 to the filter position. Specifically, as shown in FIGS. 3, 5 and 6, the end of the valve handle 36 having the indicator 112 is turned to be aligned with the flow indicator or word "Filter" (135) on the upper surface 46 of the valve body 32. This indicates that the valve member 34 is in the first position or filter position. When the valve member 34 is in the "filter" position (FIG. 3), the opening 86 to the third flow channel 84 is aligned with the inlet port 40 of the valve body 32 (FIG. 5). Also, the first flow channel 80 is aligned with the outlet port 42 of the valve body 32. In this position, incoming water flows through the opening 136 and downward through the third flow channel 84 until reaching the support plate 114.

A gap or space 136 (FIG. 5) is defined between the bottom of the valve member 34 and the upper surface 120 of the support plate 114 such that the incoming water is directed through the gap or space and then downwardly into the filter body 24. The filter body 24 defines an outer annular chamber 138 that is adjacent to the filter element 30 such that the incoming water is directed into the outer annular chamber and then through the filter element until reaching the inner or central chamber 130.

The filtered water then exits upwardly through the first flow channel 80 and through the outlet port 42 to water piping in the household or building. As shown in FIG. 5, when in the filter position, the valve member 34 causes the incoming water to flow outwardly from the valve member and then downwardly into the filter body 24 to be filtered by the filter element 30.

Figure 7:
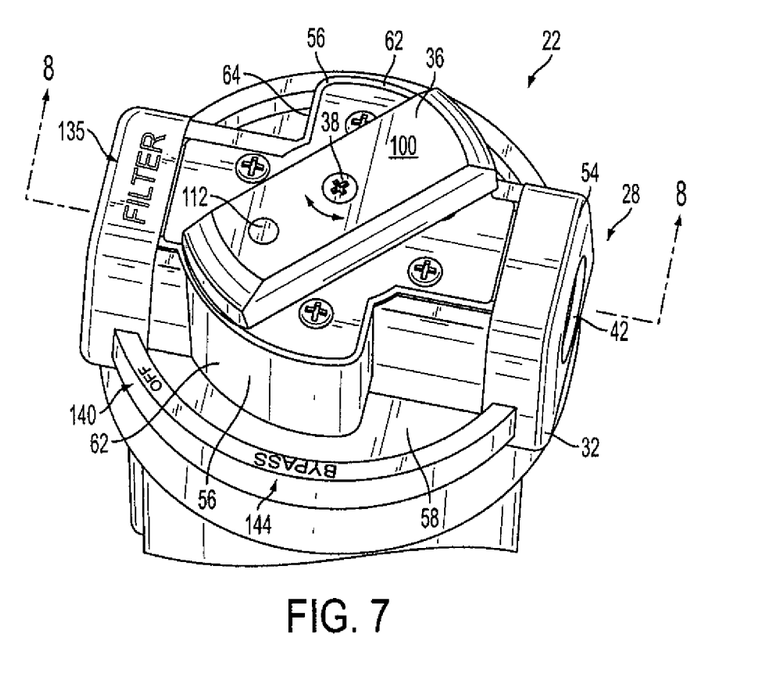
FIG. 7 is a top perspective view of the filter head of FIG. 3 where the valve member is in the "off" position.

Referring now to FIGS. 7-9, to shut off the incoming water and prevent it from flowing through the filter system 20, a user rotates or turns the valve handle 36 and more specifically, the end of the valve handle having the indicator 112 is then aligned with the flow indicator or word "Off" (144) on the valve body 32. In this position, there are no openings or flow channels that are in communication with the inlet port 40 or the outlet port 42. This construction prevents the incoming water from flowing through the filter system 20. As stated above, O-rings 142 are positioned adjacent to the inlet and outlet ports 40, 42 for sealing purposes.

In conventional filter systems, the valve member has to be in the "off" position to allow a user to remove the filter body from the filter head to change the filter element. Thus, the incoming water supply to the household or building is shut off until the filter element is replaced within the filter body and the filter body is re-attached to the filter head. If a filter element is not readily available or is broken, or if the filter body itself is malfunctioning or broken, the water supply to the household or building would remain shut off until the issue is resolved, which is a significant burden to a user.

The present filter system 20 and more specifically, the present bypass valve overcomes this problem by providing a bypass position. In the bypass position, the valve is constructed such that water bypasses or is diverted away from the filter body 24 while still flowing through the valve body 32. Therefore, water can continuously flow through the valve body 32 while the filter element 30 is being replaced.

Figure 11:
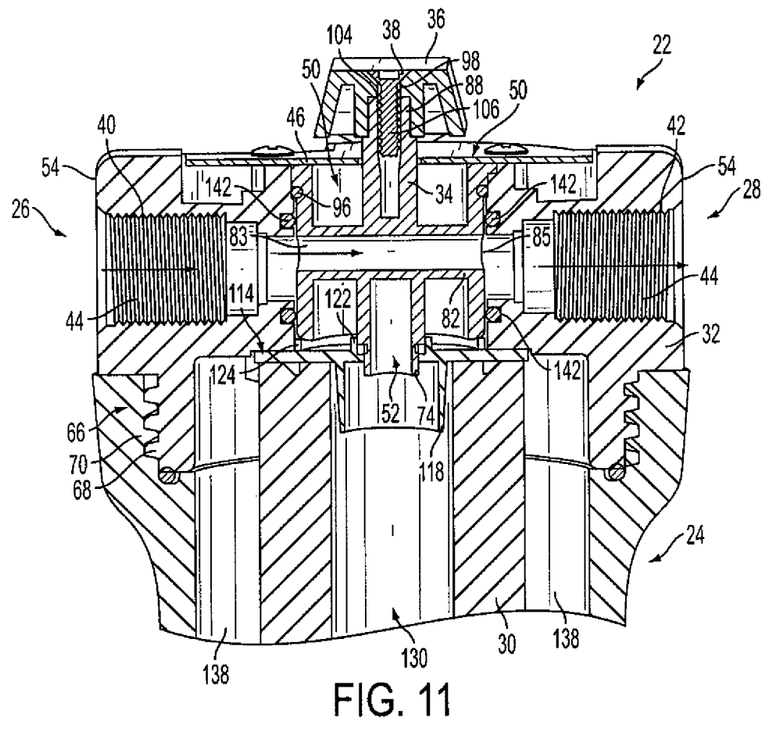
FIG. 11 is a cross-section of the filter head of FIG. 10 taken along the line 11-11 and in the direction generally indicated.

Referring now to FIGS. 10-12, to activate the bypass feature, a user turns or rotates the handle 36 so that the indicator 112 is aligned with the flow indicator or word "Bypass" (116) on the valve body 32. In the bypass position, the second flow channel 82, which is a generally a straight through-hole defined by the valve member 34, has one end (opening 83) aligned with the inlet port 40 and an opposite end (opening 85) aligned with outlet port 42 of the valve body. An O-ring 142 is provided on the inlet port 40 and the outlet port 42 for preventing water from leaking into the filter body 24 or out of the top of the valve member 34.

In the "bypass" position, the incoming water flows through the filter head 22 without passing through the filter element 30 to allow water to continuously be supplied to the household or building without disruption. In this position, the filter body 24 can be removed from the filter head 22 and the filter element 30 can be replaced and/or repaired. The filter body 24 is then re-connected to the filter head 22 and the valve handle 36 can return to the filled position to restart the filtering process.

The present filter system 20 therefore has three positions which allow for the incoming water to be completely shut off, filtered or passed through unfiltered to avoid inconvenient disruptions in the water supply.

While a particular embodiment of the present bypass valve for a filter system has been described herein, it will be appreciated by those skilled in the art that changes and modifications may be made thereto without departing from the invention in its broader aspects and as set forth in the following claims.

The invention claimed is:

1. A water filter system having a filter element comprising:
 a head including a three-way valve member including a first flow channel, a second flow channel and a third flow channel, wherein said first, second and third flow channels are separate, non-intersecting flow channels that are spaced from each other, said valve member being movable between a first position, a second position, and a third position, said head defining a longitudinal axis;
 a filter housing removably mounted to said head and including the filter element; and
 a support plate seated in said filter housing, said support plate being transverse to and extending radially from the longitudinal axis, said support plate including upwardly extending tabs configured for aligning said valve member with said filter housing, and a downwardly extending wall for aligning said support plate with said filter housing,
 wherein when the valve member is in the first position, incoming water is directed through said third flow channel to the filter element to remove sediment and impurities from the water and filtered water flows out through said first flow channel, when the valve member is in the second position, the incoming water is blocked from passing through the filter element and the valve member, and when the valve member is in the third position, the incoming water passes through said second flow channel of the valve member and not the filter element so that the filter element can be removed and replaced without interrupting the incoming water flow.

2. The water filter system of claim 1, further including an inlet port and an outlet port, said third flow channel defining a through channel and said second flow channel defining a bypass channel, wherein when said valve member is in the first position, said through channel is aligned with said inlet port and said outlet port, when said valve member is in said second position, neither said through channel nor said bypass channel are aligned with said inlet and outlet ports, and when said valve member is in the third position, said bypass channel is aligned with said inlet and outlet ports.

3. The water filter system of claim 1, further comprising a handle rotatably mounted to said valve member and a stop projecting upwardly from a housing of said valve member such that rotational movement of said handle is stopped when said handle engages said stop.

4. A water filter system having a body and a filter element in the body, the water filter system comprising:
 a filter head including an inlet, an outlet and a rotatable valve member defining a through channel and a bypass channel, wherein said bypass channel is spaced from and does not intersect said through channel, said filter head defining a longitudinal axis;
 a support plate seated in the body, said support plate being transverse to and extending radially from the longitudinal axis, said support plate including upwardly extending tabs configured for aligning said valve member with the body, and a downwardly extending wall for aligning said support plate with the body; and
 a handle mounted to said rotatable valve member, said handle being rotatable to one of an "on" position, an "off" position and a "bypass" position,
 wherein when said handle is in said "on" position, said through channel is aligned with said inlet and said outlet to allow water to flow through the filter element, when said handle is in said "off" position, neither of said through channel and said bypass channel are aligned with said inlet and said outlet, and when said handle is in said "bypass" position, said bypass channel is aligned with said inlet and said outlet to allow water to flow through said bypass channel but not through the filter element.

5. The water filter system of claim 4, wherein said handle is misaligned with said through channel such that a position of said handle does not indicate a direction of water flow.

6. The water filter system of claim 4, further including at least one flow indicator that corresponds to each of said positions of said handle.

7. The water filter system of claim 4, wherein said through channel is generally straight and extends between opposing sides of said rotatable valve member.

8. The water filter system of claim 4, wherein at least a portion of said head projects upwardly to stop rotational movement of said handle.

9. A water filter system comprising:
 a head including an inlet, an outlet and a rotatable valve member defining a through channel and a bypass channel wherein said through channel and said bypass channel are separate, non-intersecting flow channels that are spaced from each other, said head defining a longitudinal axis;
 a handle mounted to said rotatable valve member, said handle being rotatable to one of an "on" position, an "off" position and a "bypass" position;
 a filter housing removably mounted to said head and including a filter element for removing sediment and impurities from water; and
 a support plate seated in said filter housing, said support plate being transverse to and extending radially from the longitudinal axis, said support plate including upwardly extending tabs configured for aligning said valve member with said filter housing, and a downwardly extending wall for aligning said support plate with said filter housing,
 wherein when said handle is in said "on" position, said through channel is aligned with said inlet and said outlet to allow water to flow through said filter element, when said handle is in said "off" position, neither of said through channel and said bypass channel are aligned with said inlet and said outlet, and when said handle is in said "bypass" position, said bypass channel is aligned with said inlet and said outlet to allow water to flow through said head but not through said filter element.

10. The water filter system of claim 9, wherein said handle is misaligned with said through channel such that a position of said handle does not indicate a direction of water flow through said head.

11. The water filter system of claim 9, further comprising a tray positioned between said head and said filter housing, said tray configured for supporting said head.

12. The water filter system of claim 9, wherein at least a portion of said head projects upwardly to stop rotational movement of said handle.

* * * * *